Dec. 7, 1965     H. FRIEDMAN ETAL     3,222,560
RADIATION SENSITIVE SPARK TUBE
Filed Nov. 20, 1961
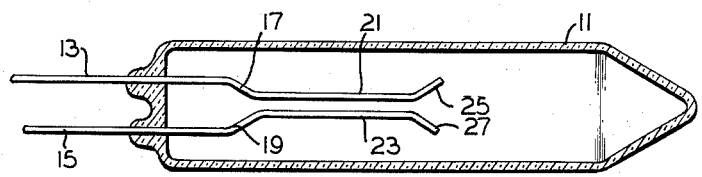
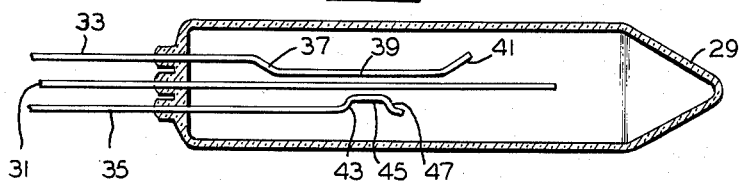
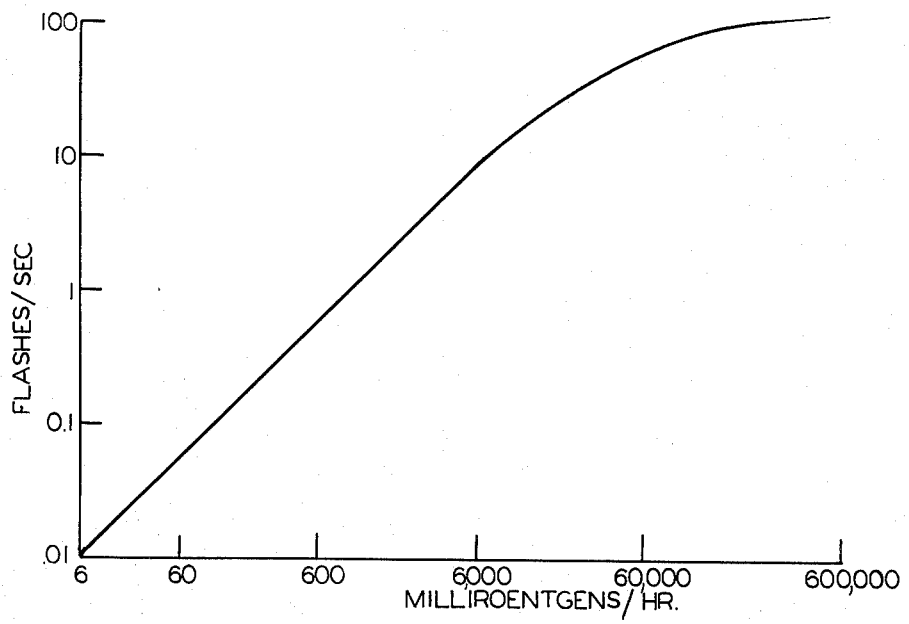
INVENTOR.
HERBERT FRIEDMAN
TALBOT A. CHUBB

United States Patent Office

3,222,560
Patented Dec. 7, 1965

3,222,560
RADIATION SENSITIVE SPARK TUBE
Herbert Friedman, 2643 N. Upshur St., and Talbot A.
Chubb, 5023 N. 38th St., both of Arlington, Va.
Filed Nov. 20, 1961, Ser. No. 153,589
9 Claims. (Cl. 313—93)

This invention relates to spark counter tubes and more specifically to radiation sensitive counter tubes which respond to disaster ranges of radiation levels which further provide a visible indication thereof.

The increased concern which now exists in connection with possible thermonuclear attack has created a great need and demand for a reliable low cost device which may accurately indicate the quantity of radioactivity present in order to determine whether the level of such radioactivity is at a safe or a dangerous level.

Many forms of radiation detecting instruments and devices are well known and are available for use in apppli- cations which require exact scientific measurements. Additionally, devices are available for indicating low radiation levels for use in prospecting for radioactive ores. Devices commonly known as dosimeters are also available which indicate the time integral of radiation received by this type of device. However, a need still exists for a continuously observable device wherein an instantaneous quantitative indication is desired and which may be obtained for a relatively low cost by a vast number of individuals. Present radiation detector instruments have been inherently complex and expensive, particularly in power supply arrangements for satisfactory use with battery voltage supplies. Due to the fact that batteries of the dry cell type produce a decreasing voltage in relation to the age of the battery, many of these devices are impractical for use with a battery due to the fact that they may be stored for considerable periods of time before the need for them arises.

Accordingly, it is an object of this invention to provide a simple, reliable detector for radiation detection.

Another object of this invention is to provide a spark counter tube which is relatively insensitive to changes in voltage amplitude and which provides a spark carrying a high current.

A further object is to provide a radiation sensitive spark tube which reduces to a minimum the deterioration of tube aging.

A still further object of this invention is to provide a spark tube having a small volume which responds to the disaster range of radiation intensity.

Yet another object of this invention is to provide a spark counter tube which is capable of being manufactured on a mass production basis and which is relatively simple and economical to produce.

Generally speaking the present invention relates to a tube comprising a glass enclosure filled with a negative ion forming gas as a quenching agent and an inert gas having at least two electrodes extending into the enclosure or envelope. The two electrodes are formed in accordance with predetermined requirements so that the electrodes are in closer proximity at one section thereof than the remaining parts of the electrodes. A pulse voltage is applied to the electrodes, the amplitude of the pulse being below that necessary to cause an ionization of the gases within the tube and a resultant spark. A coincidence of an ionizing event such as radiations causes an arc between the vicinal, i.e. closest, sections of the electrodes and a discharge occurs resulting in a spark, the frequency of which is related to the frequency of the applied pulses and the intensity of the radiation.

The above and other objects will be apparent from the following detailed description when taken in conjunction with the accompanying drawings wherein:

FIG. 1 is a sectional view of a basic form of the present invention;

FIG. 2 is a sectional view of a tube with an additional electrode; and

FIG. 3 is a representative logarithmic curve showing the relationship between the spark interval and the degree of radiation intensity in the atmosphere.

Turning now more specifically to the drawings, FIG. 1 shows an envelope which may be made of any radiation permeable material such as glass, and which has enclosed therein a gas which will be specifically discussed below. Two electrodes 13 and 15 extend through the glass enclosure and into the inner portion of the tube. Each of these electrodes are formed within the tube so as to create bends 17 and 19 respectively followed by substantially parallel sections of the electrodes 21 and 23 and are terminated with outwardly extending bends 25 and 27. The primary purpose of the curvilinear structure of the electrodes is to control the volume between the two electrodes wherein sparking can occur. Thus, the sparking volume within the tube is limited to that volume between the substantially parallel sections of the electrodes 21 and 23. Accordingly, as radiations pass between the vicinal sections of the electrodes and ionize the gas within the envelope a sparking will occur at some point between these two sections. The electrodes are further separated at their outward extremities 25 and 27 in order to eliminate any possibility of terminal effects between the electrodes by reducing the electric field in these critical regions.

The basic gas components within the envelope are a negative ion forming quenching agent which may be an electro-negative gas such as chlorine or bromine and an inert gas such as neon or helium. Although the tube has been found to operate in accordance with the present invention using only these two gases, the addition of a metal halide gas such as tin tetrachloride stabilizes the operation of the tube by eliminating arcing due to radiation in the proximity of the electrodes but not actually between the vicinial sections of the electrodes.

The operating characteristics of tube 1 are shown in FIG. 3. The results indicated in FIG. 3 were obtained by using the spark tube of FIG. 1 in the circuit shown and described in Patent No. 2,964,632, issued December 13, 1960 and entitled "Coincidence Glow Radiation Detector." The tube as shown in FIG. 1 of the present drawings was used to replace the Geiger-Muller tube of that patent. A voltage having a pulse repetition rate of 100 pulses per second was applied to the electrodes of the tube and the intensity of the radiation field was increased from zero up to a maximum disaster radiation range. A compressed scale was developed on the basis of the steady pulse application and a radiation field measured in milliroentgens per hour as indicated on the chart. As the radiation field was increased the pulses correspondingly increased on a substantially straight line value up to about 60,000 milliroentgens per hour and then increased asymptotically to the point of 600,000 milliroentgens per hour which is considered to be a lethal dose if a person is subjected to this degree of radiation for a period of one hour. The visual indication within the spark tube itself gives an approximate determination of the radiation to which the tube is subjected. However, the same circuit arrangement as that shown in the above identified patent may be used including either the neon glow tube if a brighter glow indication is considered to be desirable or an audio signal indicator if an audible signal is desired or both.

Although the curve of FIG. 3 is basic to the operating characteristics of any tube designed in accordance with the present invention when used in the system indicated, the time interval between the sparks may be varied by changing the effective volume between the electrodes. If this effective volume were increased by extending the length of the parallel portions 21 and 23 of the tube 11 as shown in FIG. 1, and the pulse repetition were to remain constant, the number of flashes per second would be increased for a like degree of radiation. Accordingly, the curve illustrated in FIG. 3 would, in effect, be moved to the left and the high flashing rate of the tube would be reached at a lower radiation intensity. Likewise, if the effective volume were to be reduced by shortening the parallel portions of the electrodes 21 and 23 with the same pulse repetition rate, the number of flashes per second would be decreased and the curve of FIG. 3 would be shifted to the right. It will be evident therefore that the tube of this invention may be designed so as to be adaptable for any desired radiation intensity range.

A tube may also be designed so as to provide a dual indication representative of two differing ranges of radiation intensity as shown in FIG. 2. The enclosure 29 has extending therethrough a central, substantially linear electrode 31 with electrodes 33 and 35 secured within the tube on opposite sides of electrode 31. Electrode 33 is similar to electrode 13 in FIG. 1 and has therein the curvilinear structure comprised of bend 37, parallel section 39 and the outer bend 41. Electrode 35 is similar to electrode 33 but has a much shorter section of electrode 45 parallel to central electrode 41 with the bend portions 43 and 47 providing the end curvilinear structure. In operation, the pulses may be applied between electrodes 31 and 33 or 31 and 35 depending upon the level of radiation being measured. When the tube of FIG. 2 is to be used with the circuitry in the above mentioned patent, the leads 33 and 35 may be connected to a switching means with the common electrode connected directly to the indicating device. It will be evident that this type of construction provides a low intensity indication between electrodes 33 and 31 and high intensity indication between leads 35 and 31. If desired, additional electrodes could be incorporated in the tube, each having a configuration such that a plurality of radiation levels could be measured. The ultimate practical upper limit of measurable radiation level could be obtained by having an electrode located at a right angle to the central electrode.

One of the outstanding features of the tube of the present invention is that it is relatively insensitive to variations in the voltage amplitude of the supplied pulses. This becomes highly important when the tube is to be used with a dry cell battery supply such as is described in the above mentioned patent. Since the voltage output of a battery decreases with age, in many applications the useful life of the battery is terminated rather abruptly. However, with the present invention, the useful life of a dry cell battery is greatly extended since the operating characteristics of the tube remain nearly the same over a large range of battery voltage output.

The tube of the present invention also has numerous advantages over the standard Geiger-Muller type tube normally used as a radiation detector. Deterioration of the tube with age due to the effect of the gas on the metal surfaces is minimized in the present invention due to the fact that wires are used as electrodes instead of cylinders, thus substantially reducing the area of the electrodes. Additionally, the geometry of the tube allows production of a device which is small and at the same time sensitive to the disaster range of radiation intensity. When a tube is used having a cylindrical electrode, it is of necessity comparatively large in comparison with the tube of the present invention.

The construction of the present tube is also much simpler than that of standard radiation detectors in that outgassing and decontamination of a tube having a cylindrical electrode requires a much more rigid procedure for constructing the device than for the tubes of the present invention. Additionally, the necessity of exact electrode alignment and the avoidance of end effect, which is an extreme problem in tubes having cylindrical electrodes, is practically eliminated by the present invention.

The partial pressures of the gases used in the tubes may vary through a considerable range without affecting the basic operating characteristics. The electronegative gas may have a partial pressure ranging from approximately 5 to 60 millimeters of mercury and the inert gas may have a partial pressure ranging from 70 to 7000 millimeters. When the metal halide gas is used its normal range would be from ¼ to 2¼ millimeters.

It is to be understood that the above description and the drawings are illustrative only and that many variations of the actual structure of the tube may be designed within the scope of the present invention. Essentially, the invention provides a trouble-free spark counter consisting of electrodes having intermediate vicinal sections thereof, the remaining portions of the electrode being separated at a distance substantially greater than the vicinal sections. With this arrangement the vicinal sections of the electrodes provide the discharge volume. When this arrangement is used in combination with electronegative gases, a spark tube of simple structure, long life and trouble-free operation is provided. Additionally, with the intermediate discharge sections of the electrodes providing the controlled sparking volume, end effect is automatically controlled to a degree which cannot be obtained in any of the known radiation detection devices.

Although the device has been specifically described in connection with radiations commonly associated with atmospheric conditions resulting from thermonuclear explosions, it will be obvious that such a spark tube as disclosed herein may also be designed for use in detecting other types of radiations.

We claim:

1. A radiation sensitive spark counter comprising a sealed envelope, a first wire electrode extending within said envelope, a second wire electrode extending within said envelope parallel to said first wire, said wires having a configuration such that the distance between the center of the electrodes is less than the distance between the ends of said electrodes, and a gaseous filling within said envelope consisting essentially of an electronegative gas having a partial pressure between 5 and 60 millimeters of mercury and an inert gas having a partial pressure between 70 and 7000 millimeters of mercury.

2. A radiation sensitive device comprising an envelope, a pair of wire electrodes extending within said envelope with the extremities of said electrodes being substantially parallel, one of said electrodes having a curvilinear portion extending in the direction of the other electrode and a gaseous filling within said envelope consisting essentially of an electronegative gas having a partial pressure between 5 and 60 millimeters of mercury and an inert gas having a partial pressure between 70 and 7000 millimeters of mercury.

3. A radiation sensitive device comprising an envelope, a pair of wire electrodes extending within said envelope with the extremities of said electrodes being substantially parallel, one of said electrodes having a curvilinear portion extending in the direction of the other electrode and a gaseous filling within said envelope consisting essentially of an electronegative gas having a partial pressure of between 5 and 60 millimeters of mercury, an inert gas having a partial pressure between 70 and 7000 millimeters of mercury and a metal halide gas having a partial pressure between ¼ and 2¼ millimeters of mercury.

4. A radiation sensitive spark counter comprising an envelope, a plurality of electrodes extending within said envelope, one of said electrodes being substantially parallel to the axis of said envelope, each of the other electrodes having a section thereof spaced a distance from said one of said electrodes less than the distance between the remaining portion of said other electrodes and said one of said electrodes, and a gaseous filling with said envelope consisting essentially of an electronegative gas having a partial pressure between 5 and 60 millimeters of mercury and an inert gas having a partial pressure between 70 and 7000 millimeters of mercury.

5. A radiation sensitive spark counter comprising an envelope, a plurality of electrodes extending within said envelope, one of said electrodes being substantially parallel to the axis of said envelope, each of the other electrodes having a section thereof spaced a distance from said one of said electrodes less than the distance between the remaining portion of said other electrodes and said one of said electrodes, and a gaseous filling within said envelope consisting essentially of an electronegative gas having a partial pressure between 5 and 60 millimeters of mercury, an inert gas having a partial pressure between 70 and 7000 millimeters of mercury and a metal halide gas having a partial pressure between ¼ and 2¼ millimeters of mercury.

6. A radiation sensitive spark tube comprising an envelope, a first substantially linear electrode extending within said envelope, at least one further electrode extending through said envelope and having an intermediate section thereof relatively nearer to said first electrode than the remaining area of said further electrode and a gaseous filling within said envelope consisting essentially of an electronegative gas having a partial pressure between 5 and 60 millimeters of mercury and an inert gas having a partial pressure between 70 and 7000 millimeters of mercury.

7. A radiation sensitive spark tube comprising an envelope, a first substantially linear electrode extending within said envelope, at least one further electrode extending through said envelope and having an intermediate section thereof relatively nearer to said first electrode than the remaining area of said further electrode and a gaseous filling within said envelope consisting essentially of an electronegative gas having a partial pressure between 5 and 60 millimeters of mercury, an inert gas having a partial pressure between 70 and 7000 millimeters of mercury and a metal halide gas having a partial pressure between ¼ and 2¼ millimeters of mercury.

8. A radiation sensitive device comprising an envelope, a first electrode extending within said envelope, a second electrode extending within said envelope, said first and second electrodes having intermediate sections relatively closer than the remaining parts of the electrodes and a gaseous filling within said envelope consisting essentially of an electronegative gas having a partial pressure between 5 and 60 millimeters of mercury and an inert gas having a partial pressure between 70 and 7000 millimeters of mercury.

9. A radiation sensitive device comprising an envelope, a first electrode extending within said envelope, a second electrode extending within said envelope, said first and second electrodes having intermediate sections relatively closer than the remaining parts of the electrodes and a gaseous filling within said envelope consisting essentially of an electronegative gas having a partial pressure between 5 and 60 millimeters of mercury, an inert gas having a partial pressure between 70 and 7000 millimeters of mercury and a metal halide gas having a partial pressure between ¼ and 2¼ millimeters of mercury.

References Cited by the Examiner

UNITED STATES PATENTS

| | | | |
|---|---|---|---|
| 1,271,794 | 7/1918 | Stevenson | 313—214 X |
| 2,141,655 | 12/1938 | Kott | 313—214 X |
| 2,584,844 | 2/1952 | Constable | 250—83.6 |
| 2,612,615 | 9/1952 | Fehr et al. | 313—291 X |
| 2,824,991 | 2/1958 | Hendee et al. | 313—93 |
| 2,936,388 | 5/1960 | Chubb et al. | 250—83.6 X |
| 2,964,632 | 12/1960 | Freedmann et al. | 313—93 X |
| 3,019,363 | 1/1962 | Wiechering | 313—93 |
| 3,029,342 | 4/1962 | Reiffel | 313—61 X |
| 3,054,918 | 9/1962 | Morgan | 313—93 |

FOREIGN PATENTS 860,539   2/1961   Great Britain.

OTHER REFERENCES

Article by Friedman: "Geiger Counter Tubes," Proceedings of the I.R.E. (pp. 791–808, p. 792 relied on) July 1949.

GEORGE N. WESTBY, *Primary Examiner.*

ARTHUR GAUSS, *Examiner.*